United States Patent [19]
Rath et al.

[11] Patent Number: 5,976,202
[45] Date of Patent: Nov. 2, 1999

[54] REACTION PRODUCTS OF POLYOLEFINS WITH VINYL ESTERS AND THEIR USE AS FUEL AND LUBRICANT ADDITIVES

[75] Inventors: Hans Peter Rath, Grünstadt; Helmut Mach, Heidelberg; Harald Schwahn, Wiesloch; Hans-Joachim Müller, Grünstadt; Wolfgang Reif; Thomas Rühl, both of Frankenthal, all of Germany

[73] Assignee: BASF Aktiengesellschaft, Ludwigshafen, Germany

[21] Appl. No.: 08/504,584

[22] Filed: Jul. 20, 1995

[30] Foreign Application Priority Data

Jul. 22, 1994 [DE] Germany ............... 44 26 003

[51] Int. Cl.⁶ ............... C10L 1/22; C10L 1/18; C07C 69/33; C07C 211/22
[52] U.S. Cl. ............... 44/432; 44/386; 44/389; 44/390; 44/392; 44/397; 44/418; 44/419; 44/433; 44/451; 208/14; 208/15; 208/16; 208/17; 208/18; 208/19; 558/420; 558/455; 560/231; 560/263; 560/264; 564/367; 564/463; 564/478; 564/479; 564/488; 564/503; 564/507; 564/511; 564/512; 568/852; 568/853; 568/858
[58] Field of Search ............... 44/389, 390, 392, 44/418, 419, 432, 433, 451, 386, 397; 560/231, 263, 264; 564/463, 478, 479, 488, 503, 507, 511, 512, 367; 568/852, 858, 853; 558/420, 455; 208/14, 15, 16, 17, 18, 19

[56] References Cited

U.S. PATENT DOCUMENTS 3,020,257  2/1962  Iwakiri et al. ............... 260/45.5

FOREIGN PATENT DOCUMENTS 0 384 367  8/1990  European Pat. Off. .
0 400 868  12/1990  European Pat. Off. .
0 529 102  3/1993  European Pat. Off. .
0 596 567  5/1994  European Pat. Off. .
1 084 026  6/1960  Germany .
2 189 251  10/1987  United Kingdom .
91/11469  8/1991  WIPO .

Primary Examiner—Peter O'Sullivan
Attorney, Agent, or Firm—Oblon, Spivak, McClelland, Maier & Neustadt, P.C.

[57] ABSTRACT

Reaction products of polyolefins having predominantly a terminal double bond and a number average molecular weight of from 250 to 10,000, which possess an aliphatic hydrocarbon skeleton which is straight-chain or carries $C_1–C_4$-alkyl side chains, with from 1 to 10 mol, per equivalent of double bond, of one or more vinyl esters I (I)

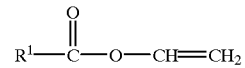

are obtainable by reacting the stated polyolefins with the vinyl esters I in the presence of a free radical initiator at from 80 to 200° C., it being possible for these reaction products subsequently to have been hydrolyzed to the corresponding alcohols or converted into the corresponding amines by reductive amination with amines II (II)

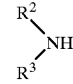

14 Claims, No Drawings

REACTION PRODUCTS OF POLYOLEFINS WITH VINYL ESTERS AND THEIR USE AS FUEL AND LUBRICANT ADDITIVES

The present invention relates to reaction products of polyolefins having predominantly a terminal double bond with vinyl esters and the hydrolysis and amination products thereof. The present invention furthermore relates to fuel and lubricant compositions which contain these reaction products as additives in effective amounts.

The carburetor and intake system of gasoline engines as well as injection systems for metering fuel into gasoline and diesel engines are contaminated by impurities caused by dust particles from the air, uncombusted hydrocarbon residues from the combusting space and the crankcase vent gases passed into the carburetor.

The residues shift the air/fuel ratio during idling and in the lower part-load range so that the mixture becomes richer and the combustion more incomplete and in turn the amounts of uncombusted or partly combusted hydrocarbons in the exhaust gas increase and the gasoline consumption rises.

It is known that, in order to avoid these disadvantages, fuel additives are used for keeping valves and carburetor or injection systems clean (M. Rossenbeck in Katalysatoren, Tenside, Mineralöladditive, Editors. J. Falbe and U. Hasserodt, page 223 et seq., G. Thieme Verlag, Stuttgart, 1978).

Depending on the mode of action, but also on the preferred place of action of such detergent additives, a distinction is now made between two generations of such assistants.

The first generation of additives was capable only of preventing the formation of deposits in the intake system but not of removing existing deposits, whereas the additives of the second generation can perform both functions (keep-clean and clean-up effect) and can do so because of their excellent heat stability, in particular in zones at relatively high temperatures, ie. in the intake valves.

The molecular structural principle of fuel detergents may be expressed in general as the linking of polar structures with generally high molecular weight, nonpolar or lipophilic radicals.

Typical members of the second generation of additives are often products based on polyisobutenes in the nonpolar moiety. Among these in turn, additives of the polyisobutenamine type are particularly noteworthy.

EP-A 244 616 (1) and EP-A 476 485 (2) disclose polybutylamines and polyisobutylamines or polyisobutylaminoalcohols, which are suitable as fuel and lubricant additives. These poly(iso)butene derivatives are saturated, are based on poly(iso)butenes having predominantly a terminal double bond and are prepared by chlorine-free syntheses.

The poly(iso)butyl compounds described above are prepared by complicated and expensive oxidation processes, ie. here specifically by hydroformylation or epoxidation. In some cases, the property spectrum of these compounds is furthermore still not optimum with regard to their effect as fuel and lubricant additives.

It is an object of the present invention to provide a preparation process which can be carried out by simple means and leads to fuel and lubricant additives having improved or at least equally good efficiency compared with the prior art compositions.

We have found that this object is achieved by reaction products of polyolefins having predominantly a terminal double bond and a number average molecular weight MN of from 250 to 10,000, which possess an aliphatic hydrocarbon skeleton which is straight-chain or carries $C_1$–$C_4$-alkyl side chains, with from 1 to 10 mol, per equivalent of double bond, of one or more vinyl esters of the general formula I

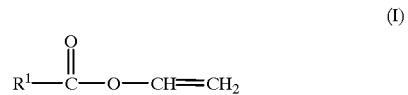

(I)

where $R^1$ is hydrogen, $C_1$–$C_{30}$-alkyl, $C_5$–$C_8$-cycloalkyl, $C_7$–$C_{18}$-aralkyl or $C_6$–$C_{14}$-aryl which may be substituted by up to three $C_1$–$C_{12}$-alkyl groups, $C_1$–$C_{12}$-alkoxy groups, cyano groups, hydroxyl groups or $C_1$–$C_4$-alkoxycarbonyl groups, which reaction products are obtainable by reacting the stated polyolefins with the vinyl esters I in the presence of free radical initiators at from 40 to 220° C., it being possible for these reaction products subsequently to have been hydrolyzed to the corresponding alcohols or converted into the corresponding amines by reductive amination with amines of the general formula II

(II)

where $R^2$ and $R^3$ may be identical or different and are each hydrogen, an aliphatic or aromatic hydrocarbon radical, a primary or secondary, aromatic or aliphatic aminoalkylene radical or a polyaminoalkylene radical, polyoxyalkylene radical or heteroaryl or heterocyclyl radical, or, together with the nitrogen atom to which they are bonded, form a ring in which further hetero atoms may be present.

In most cases, the stated reaction products are reaction products of polyolefins having predominantly a terminal double bond, of the general formula III

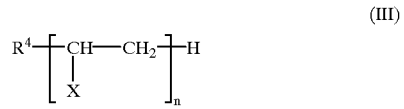

(III)

where
$R^4$ is an aliphatic hydrocarbon radical which is straight-chain or carries $C_1$–$C_4$-alkyl side chains and has a number average molecular weight MN of from 250 to 10,000, X is a group of the formula —O—CO—$R^1$, hydroxyl or amino of the formula —$NR^2R^3$, $R^1$ is hydrogen, $C_1$–$C_{30}$-alkyl, $C_5$–$C_8$-cycloalkyl, $C_7$–$C_{18}$-aralkyl or $C_6$–$C_{14}$-aryl which may be substituted by up to three $C_1$–$C_{12}$-alkyl groups, $C_1$–$C_{12}$-alkoxy groups, cyano groups, hydroxyl groups or $C_1$–$C_4$-alkoxycarbonyl groups and $R^2$ and $R^3$ may be identical or different and are each hydrogen, an aliphatic or aromatic hydrocarbon radical, a primary or secondary, aromatic or aliphatic aminoalkylene radical or a polyaminoalkylene radical, polyoxyalkylene radical or heteroaryl or heterocyclyl radical or, together with the nitrogen atom to which they are bonded, form a ring in which further hetero atoms may be present, and n is from 1 to 10.

The polyolefins used are usually polymers of $C_2$–$C_6$-olefins having a number average molecular weight MN of from 250 to 10,000, preferably from 300 to 7,500, in particular from 400 to 5,000, especially from 500 to 2,500. $C_2$–$C_6$-Olefins which may be used are ethylene, propene, 1-butene, cis- and trans-2-butenes, isobutene, 1,3-butadiene, 1-pentene, 2-pentene, 2-methyl-1-butene, 2-methyl-2-butene, 1,3-pentadiene, 1-hexene, 2-hexene, 3-hexene, 2-methylpentene, 2-methyl-2-pentene, 2-methyl-3-pentene, 2-methyl-4-pentene, 3-methyl-1-pentene, 3-methyl-2-pentene, 2-ethyl-1-butene, 3,3-dimethyl-1-butene, 1,3-hexadiene, 2,4-hexadiene, 1,5-hexadiene or 1,3,5-hexatriene. Mixtures of the stated olefins may also be used. Ethylene, propene, 1-butene, 2-butenes, isobutene, 1,3-butadiene or mixtures thereof are preferred.

The polymerization of the stated $C_2$–$C_6$-olefins to give homo- or copolymers can be carried out in one or more stages. Particularly for the synthesis of the polymer from ethylene, a two-stage procedure, for example with the pentamerization product 1-decene as an intermediate, may be advantageous with regard to properties and molecular weight distribution. This procedure converts waxy polymers to oily ones.

Owing to chain termination reactions in the polymerization, the polymers used have a double bond which is predominantly terminal (in the a-position), ie. as a rule to an extent of at least 60%, in general at least 70%. In the majority of the polyolefins used, the content of terminal double bonds is from 75 to 95%. The content of terminal double bonds is based on the total number of double bonds in all polymer molecules. In addition to terminal double bonds, small proportions of β and internal double bonds, which exhibit much lower reactivity with the stated vinyl esters, also occur.

The polyolefins described and having predominantly a terminal double bond can be prepared by methods known from the literature. In a preferred embodiment, the polyolefins used are polyisobutenes which may also contain up to 30% by weight of n-butene units, or oligomers of 1-decene, prepared in a two-stage procedure from ethylene, having a degree of oligomerization of from 3 to 10, in particular from 4 to 8.

If the polyolefins used have a slightly branched aliphatic hydrocarbon skeleton, ie. one carrying $C_1$–$C_4$-alkyl side chains, ethyl or in particular methyl side chains preferably occur, for example in the case of polyisobutene.

Examples of suitable straight-chain or branched alkyl radicals $R^1$ in the vinyl esters I and as substituents on aryl radicals which are referred to as $C_1$–$C_{30}$-alkyl and $C_1$–$C_{12}$-alkyl radicals are methyl, ethyl, n-propyl, isopropyl, n-butyl, isobutyl, sec-butyl, tert-butyl, n-amyl, isoamyl, sec-amyl, tert-amyl, neopentyl, n-hexyl, n-heptyl, n-octyl, 2-ethylhexyl, n-nonyl, isononyl, n-decyl, n-undecyl, n-dodecyl, n-tridecyl, isotridecyl, n-tetra-decyl, n-pentadecyl, n-hexadecyl, n-heptadecyl, n-octadecyl and n-eicosyl. In general, lower alkyl radicals, especially $C_1$–$C_4$-alkyl, in particular methyl and ethyl, are preferred.

Suitable $C_5$–$C_8$-cycloalkyl radicals $R^1$ are in particular $C_5$- or $C_6$-cycloalkyl, such as cyclopentyl and cyclohexyl, as well as cycloheptyl, cyclooctyl, Methylcyclopentyl, dimethylcyclopentyl, methylcyclohexyl, ethylcyclohexyl and dimethylcyclohexyl.

Examples of suitable $C_7$–$C_{18}$-aralkyl radicals $R^1$ are naphthyl -methyl, diphenylmethyl or methylbenzyl, but in particular $C_7$–$C_{18}$-phenylalkyl, such as 1-phenylethyl, 2-phenylethyl, 1-phenylpropyl, 2-phenylpropyl, 3-phenylpropyl, 2-phenyl-prop-2-yl, 4-phenylbutyl, 2,2-dimethyl-2-phenylethyl, 5-phenylamyl, 10-phenyldecyl, 12-phenyldodecyl and especially benzyl.

Examples of suitable $C_6$–$C_{14}$-aryl radicals are biphenyl, naphthyl, anthryl and especially phenyl, which may be substituted as indicated. If such substituents occur on phenyl nuclei, the preferred degree of substitution is 2 or in particular 1. Monosubstituted phenyl radicals are ortho-, meta- or preferably para-substituted, disubstituted phenyl radicals frequently have a 2,4 substitution pattern and trisubstituted phenyl radicals often have a 2,4,6 substitution pattern. Where two or three substituents occur, they may be identical or different.

Typical substituents on the aryl radicals, in particular on the phenyl nuclei, are methyl (o-, m- and p-tolyl, 2,4-dimethylphenyl and mesityl), methoxy, methoxycarbonyl and ethoxycarbonyl.

Particularly suitable further straight-chain or branched $C_1$–$C_{12}$-alkoxy groups in addition to methoxy, in particular as substituents on the phenyl nucleus, are $C_2$–$C_4$-alkoxy, such as ethoxy, n-propoxy, isopropoxy, n-butoxy, isobutoxy, sec-butoxy and tert-butoxy, as well as n-pentyloxy, n-hexyloxy, isohexyloxy, n-heptyloxy, isoheptyloxy, n-octyloxy, 2-ethylhexyloxy, isooctyloxy, n-nonyloxy, n-decyloxy, n-undecyloxy and n-dodecyloxy.

In a preferred embodiment, the vinyl esters I used are those in which $R^1$ is hydrogen or $C_1$–$C_4$-alkyl. Furthermore, in the formula III, $R^1$ in the group X=—O—CO—$R^1$ is preferably hydrogen or $C_1$–$C_4$-alkyl.

Particularly suitable vinyl esters I are vinyl butyrate, vinyl propionate and especially vinyl acetate and vinyl formate. Vinyl formate ($R^1$=H) is also advantageous because the formate can be very readily hydrolyzed in a subsequent hydrolysis and also decomposes very readily in a subsequent reductive amination, since the decomposition products CO or $CO_2$ both escape in gaseous form.

The vinyl esters I may also be used in oligomeric form, in particular as dimers to decamers, especially as dimers to hexamers.

The stoichiometric ratio of reacted vinyl esters I to polyolefins, which corresponds to the number of vinyl units n in the reaction products III, is from 1:1 to 10:1, preferably from 1:1 to 6:1. n can be controlled by the concentration of the vinyl esters I in the reaction. The end product with regard to the variable n is determined by the degree of oligomerization of the oligomeric vinyl esters used.

The reaction with the vinyl esters or their oligomers is a free radical addition reaction and is carried out at from 40 to 220° C., preferably from 80 to 200° C., in particular from 120 to 180° C., and usually from 1 to 10 bar, depending on the viscosity of the compounds used, by the addition of free radical initiators and, if required, in solution.

Particularly suitable solvents here are aliphatic hydrocarbons (eg. butane, pentane and hexane), cycloaliphatics (eg. cyclopentane, cyclohexane and cycloheptane) and chlorohydrocarbons, such as methylene chloride, carbon tetrachloride, chloroform and di- and trichloroethane. The use of liquid sulfur dioxide or oligomeric vinyl esters, in particular oligomeric vinyl esters I, as solvents is also of particular interest. Higher solvent contents generally increase the polymer conversions and reduce the degree of oligomerization of the vinyl esters.

Virtually all known free radical initiators can be used at their associated temperature level, provided that they are sufficiently soluble. Suitable free radical initiators of this type are, for example, peroxide compounds, such as tert-butyl perpivalate, tert-butyl perneodecanoate, tert-butyl perethylhexanoate, tert-butyl perisobutyrate, di-tert-butyl peroxide, di-tert-amyl peroxide, diacetyl peroxydicarbonate, tert-butyl hydroperoxide or dicyclohexyl peroxydicarbonate, or azo compounds, such as 2,2'-azobisisobutyronitrile. The free radical initiators may be used alone or as a mixture with one another. Redox coinitiators may also be used. In the case of mass polymerization, they are introduced into the polymerization reactor preferably separately or in the form of a solution.

The concentration of the polyolefins used is in general from 10 to 90% by weight and that of the vinyl esters I used is from 10to 50% by weight. The free radical initiator concentration is in general not more than 5, preferably from 0.1 to 3, % by weight, based on vinyl ester I used.

A batchwise process with vinyl ester and catalyst feed is preferred as a technical embodiment when high yields and low functionalization with regard to the variable n are desirable. Higher functionalization with regard to n is obtained in particular by increasing the vinyl ester concentration. Continuous processes can in principle also be used.

The free radical initiator residues and their decomposition products can in general remain in the reaction product provided that they do not interfere with the further processing or use.

In order to remove the byproducts which are formed, for example, by oligomerization of the vinyl esters I, distillative separation together with the solvent or an extraction method can in particular be used.

The resulting reaction products of polyolefins with vinyl esters I can, if required, be hydrolyzed to the corresponding alcohols by conventional methods, this hydrolysis taking place more smoothly if the stated reaction products have been purified beforehand as described above. Hydrolysis methods usually used here are in particular heating in a corresponding solvent with the use of acidic or basic catalysts. Examples of suitable solvents are alcohols, such as methanol, ethanol, isopropanol or isobutanol, ethers, such as tetrahydrofuran or dioxane, or amides, such as N,N-dimethylformamide or N-methylpyrrolidone, and mixtures of these solvents with one another and with water. In principle, all solvents which sufficiently dissolve both the stated reaction products and the catalysts used and which do not react with the dissolved substances, in particular with the catalysts, may be used. For example, mineral acids, such as sulfuric acid or hydrochloric acid, organic sulfonic acids, such as p-toluenesulfonic acid or methanesulfonic acid, or acidic ion exchange resins may be used as acidic catalysts. Examples of suitable basic catalysts are alkali metal hydroxides, such as sodium hydroxide or potassium hydroxide, and amines, such as diethylamine, triethylamine, morpholine, pyridine or piperidine.

The alcohols thus obtained by hydrolysis can, if required, furthermore be converted into the corresponding amines by reductive amination with the amines II. However, the described reaction products of polyolefins with vinyl esters I may also be subjected directly to the reductive amination in order to obtain the stated amines.

The reductive amination is carried out by known methods at, usually, from 150 to 250° C. and, usually, from 50 to 300 bar hydrogen over nickel-containing catalysts, if necessary in aromatic, aliphatic or cycloaliphatic solvents. The excess of amine II may be up to 50 mol.

Amines used in the reductive amination are those of the general formula II

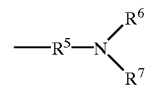
(II)

where
  $R^2$ and $R^3$ are identical or different and are each preferably hydrogen, $C_1$–$C_{10}$-alkyl, phenyl, naphthyl, $C_1$–$C_{10}$-hydroxyalkyl or aminoalkylene of the general formula IV

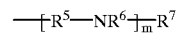
(IV)

where
  $R^5$ is $C_2$–$C_{10}$-alkylene and
  $R^6$ and $R^7$ are identical or different and are each hydrogen, $C_1$–$C_{10}$-alkyl, phenyl, naphthyl, $C_1$–$C_{10}$-hydroxyalkyl or a polybutene or polyisobutene radical, each of 20 to 400 carbon atoms, or polyaminoalkylene of the general formula V

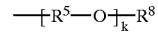
(V)

where
  $R^5$ and $R^6$ may each be identical or different,
  $R^5$, $R^6$ and $R^7$ have the above meanings and
  m is an integer from 2 to 8, or polyoxyalkylene of the general formula VI $$-\!\!\left[R^5\!-\!O\right]_{\!k}\!\!R^8$$
(VI)

where the radicals $R^5$ are identical or different and each have the above meanings, $R^8$ is hydrogen or $C_1$–$C_{10}$-alkyl and k is an integer from 1 to 30,
or $R^2$ and $R^3$, together with the nitrogen atom to which they are bonded, form a morpholinyl radical.

Examples of individual meanings of $R^2$ and $R^3$ are: hydrogen, methyl, ethyl, n-propyl, isopropyl, n-butyl, sec-butyl, isobutyl, tert-butyl, pentyl, hexyl, phenyl,

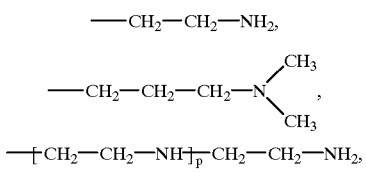

where p is an integer from 1 to 7, in particular from 1 to 3, —$CH_2CH_2$—OH and

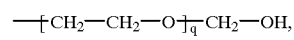

where q is an integer from 1 to 30.

The novel reaction products of the general formula III are advantageously prepared by the described reaction of the polyolefins having predominantly a terminal double bond and a number average molecular weight of from 250 to 10,000, which possess an aliphatic hydrocarbon skeleton which is straight-chain or carries $C_1$–$C_4$-alkyl side chains, with from 1 to 10 mol, per equivalent of double bond, of one or more vinyl esters I in the presence of free radical initiators at from 40 to 220° C., it being possible for the resulting compounds having carboxylic ester groups subsequently to be hydrolyzed, in the manner described, to the corresponding alcohols or to be converted into the corresponding amines by reductive amination with the amines II. In principle, however, the reaction products III may also be prepared by other processes.

Owing to their properties as detergents and dispersants, novel reaction products of polyolefins with vinyl esters I or the reaction products III are used in fuels, in particular in fuels for gasoline engines. However, they can also be used as additives in lubricants.

If the novel reaction products of polyolefins with vinyl esters I or the reaction products III are used in fuels, they are preferably added in an amount of from 10 to 5000 ppm, in particular from 50 to 1000 ppm. As a rule, lubricants must have a higher content of additives, and the amounts in this case may be from 0.1 to 6, in particular from 0.5 to 5, % by weight.

If it is intended primarily to utilize the dispersing properties of the novel substances, they may also be combined with conventional detergents as further additives.

In principle, any known products suitable for this purpose may be used as detergent components in the mixture with the novel substances as dispersants, as described, for example, in J. Falbe and U. Hasserodt, Katalysatoren, Tenside und Mineralöladditive, G. Thieme Verlag Stuttgart, 1978, page 223 et seq., or in K. Owen, Gasoline and Diesel Fuel Additives, John Wiley & Sons, 1989, page 23 et seq. N-Containing detergents, for example compounds which contain an amino or amido group, are preferably used. Polyisobutenamines according to (1), ethylenediaminetetraacetamides and/or ethylenediaminetetraacetimides according to EP-A 356 725 are particularly suitable, reference being made to the definitions in these publications. The products described there also have the advantage of being chlorine-free or chloride-free as a result of their preparation, as in the case of the novel reaction products.

If it is intended primarily to utilize the detergent effect of the novel reaction products, these substances can also be combined with carrier oils. Such carrier oils are known, and carrier oils based on polyglycol, for example corresponding ethers and/or esters, as described in US-A 5 004 478 or DE-A 38 38 918, are particularly suitable. Polyoxyalkylene monools having terminal hydrocarbon groups (US-A 4 877 416) or carrier oils as disclosed in DE-A 41 42 241 may also be used. Novel reaction products of polyolefins with vinyl esters I or reaction products III in which the carboxylic ester function is still present in the product in each case can themselves be used as carrier oil components in fuel and lubricant compositions. Here, their amount is from 0.1 to 30, preferably from 1 to 20, in particular from 3 to 10, % by weight, based on the total amount of the fuel or lubricant composition.

Suitable fuels for gasoline engines are leaded and in particular unleaded regular and premium-grade gasoline. The gasolines may also contain components other than hydrocarbons, for example alcohols, such as methanol, ethanol or tert-butanol, and ethers, eg. methyl tert-butyl ether. In addition to the novel reaction products, the fuels also contain, as a rule, further additives, such a corrosion inhibitors, stabilizers, antioxidants and/or further detergents.

Corrosion inhibitors are generally ammonium salts of organic carboxylic acids, which, owing to an appropriate structure of the starting compounds, tend to form films. Amines for reducing the pH are also frequently used in corrosion inhibitors. Heterocyclic aromatics are generally used for preventing corrosion of nonferrous metals.

The novel reaction products can advantageously be prepared by free radical addition reactions of vinyl esters with polyolefins by a process which is simple and cheap to carry out. The products obtained can be used as additives in fuel and lubricant compositions and are equally efficient or even more efficient than conventional compositions in this application.

PREPARATION EXAMPLES

Example 1

In a 1.2 l stainless steel autoclave with a stirrer, 200 g of polyisobutene having 91% of terminal double bonds, a number average molecular weight $\overline{M}_N$ of 1021 and a dispersity D of 1.6 (determined using polyisobutene calibration samples on a column combination comprising 30 cm each of $10^3$ and $10^5$ Å Ultrastyragel having a particle size of 7 μm) were dissolved in 200 g of hexane, 34 g of vinyl acetate and 1.5 g of di-tert-butyl peroxide were added and the mixture was heated to 180° C. while stirring. After one hour, the mixture was cooled, the acetate conversion was determined as 51% by gas chromatography, hexane, vinyl acetate and vinyl acetate oligomers were stripped off up to 230° C. (1 mbar) and the residue was analyzed.

The product had a saponification value of 20.4 and a polyisobutene conversion of 40%, which was determined by means of HPLC. The characteristic data showed that 1.0 mol of vinyl acetate was incorporated per mole of reacted polyisobutene. The double bond analysis by means of $^{13}$C-NMR showed that the addition had taken place virtually exclusively at the terminal double bond.

Example 2

The experiment was carried out similarly to Example 1, but the amount of vinyl acetate was increased to 161 g and that of the free radical initiator to 4.35 g. An ester conversion of 64.5%, a polyisobutene conversion of 44% and a saponification value of the residue of 128 were obtained. This gave on average 5.7 acetate units per mole of reacted polyisobutene.

Example 3

The experiment was carried out similarly to Example 1, but with 28.5 g of vinyl formate and at a reaction temperature of 160° C. A formate conversion of 49%, a polyisobutene conversion of 38% and a saponification value of 30.1 were obtained, which corresponded to about 1.5 acetate units per mole of reacted polyisobutene.

Examples 4 to 6

Aliquot amounts of 0.01 molar solution of triethylamine in isobutanol were refluxed for one hour per 100 g of the distillation residues from Examples 1 to 3, 30 g of ethanol were then added and, after a further hour, the mixture was freed from amine, alcohols and acetates by distillation. At 230° C. (1 mbar), hydrolysis products whose OH numbers were slightly above the saponification values of the starting materials were obtained as residues. A polymer having an OH number of 21.5 was obtained from Example 1, a polymer having an OH number of 149 from Example 2 and a polymer having an OH number of 31.0 from Example 3.

Examples 7 and 8

The polymers from Examples 3 and 5 were subjected to reductive amination with ammonia. For this purpose, 80 g of the polymers in 200 ml of ammonia were treated with 60 g of ethanol and 20 g of Raney cobalt in a 1 l rotating autoclave with 200 bar of hydrogen at 180° C. for 5 hours. After cooling, the catalyst was separated off by filtration, the excess ammonia was evaporated and the solvent was separated off by distillation. The amine numbers were 29.8 (Example 3) and 150 (Example 5).

Testing of performance characteristics

With regard to testing of the performance characteristics, Example 1 was tested as a carrier oil component for polybuteneamine according to (1) for fuels, Example 7 as a fuel and lubricant additive and Example 8 as a fuel additive.

The valve-cleaning action of the additive-containing fuels was evaluated with respect to valve deposits in the Opel Kadett 1.2 l engine by the standardized test according to CEC method F-02-C79 after 40 hours.

The dispersing action for lubricating oils was determined by means of the spot method, which is described by A. Schilling in Les Huiles Pour Moteurs et la Graissage des Moteurs, Volume 1, 1962, pages 89–90). The dispersant action was tested at 20° C. and at 250° C.

The test fuel used was additive-free premium-grade fuel from a German refinery, a blend of crack gasoline, pyrolysis gasoline, isopentane, butane, alkylate and reformate (platformate).

The data listed in the table below show that the novel fuel or lubricant composition is superior to the prior art with regard to valve-cleaning effect and dispersing effect.

| Example No. | Polymer from Example No. | Additives introduced | Intake valve deposit [mg/valve] | Dispersant evaluation at 20° C./250° C. (good = 600–800) |
|---|---|---|---|---|
| 9 | 1 | 300 ppm + 300 ppm polybuteneamine | 0 | — |
| 10 | 8 | 300 ppm | 18 | — |
| 11 | 7 | 300 ppm | 17 | — |
| 12 | 7 | 3% by weight | — | 810/780 |
| Comparison A | — | — | 422 | — |
| Comparison B | — | 300 ppm polybuteneamine | 21 | — |
| Comparison C | — | 3% by weight | — | 580/540 |

Here, test run A indicates the base value for the additive-free fuel. Test run B indicates the prior art with a polybuteneamine according to (1), Example 1. Comparative Example C illustrates the testing of a conventional polyisobutenyl-succinimide by means of the abovementioned spot method.

We claim:

1. A reaction product of a polyolefin having predominantly a terminal double bond and a number average molecular weight of from 250 to 10,000, which possesses an aliphatic hydrocarbon skeleton which is straight-chain or carries $C_1$–$C_4$-alkyl side chains, with from 1 to 10 mol %, per equivalent of double bond, of one or more vinyl esters of the formula I

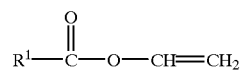

where $R^1$ is hydrogen, $C_1$–$C_{30}$-alkyl, $C_5$–$C_8$-cycloalkyl, $C_7$–$C_{18}$-aralkyl or $C_6$–$C_{14}$-aryl which may be substituted by up to three $C_1$–$C_{12}$-alkyl groups, $C_1$–$C_{12}$-alkoxy groups, cyano groups, hydroxyl groups or $C_1$–$C_4$-alkoxycarbonyl groups, obtainable by reacting the stated polyolefin with the vinyl esters I in the presence of a free radical initiator at from 40 to 220° C., it being possible for this reaction product subsequently to have been hydrolyzed to the corresponding alcohol or converted into the corresponding amine by reductive amination with an amine of the formula II

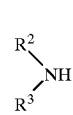

where $R^2$ and $R^3$ may be identical or different and are each hydrogen, an aliphatic or aromatic hydrocarbon radical, a primary or secondary, aromatic or aliphatic aminoalkylene radical or a polyaminoalkylene radical, a polyoxyalkylene radical or a hetaryl or heterocyclyl radical, or, together with the nitrogen atom to which they are bonded, form a ring in which further hetero atoms may be present.

2. A reaction product of a polyolefin with a vinyl ester I as claimed in claim 1, in which $R^1$ is hydrogen or $C_1$–$C_4$-alkyl.

3. A reaction product of a polyolefin having predominantly a terminal double bond and of the formula III

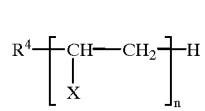

where $R^4$ is an aliphatic hydrocarbon radical which is straight-chain or carries $C_1$–$C_4$-alkyl side chains and has a number average molecular weight of from 250 to 10,000, X is a group of the formula —O—CO—$R^1$, hydroxyl or amino of the formula —$NR^2R^3$, $R^1$ is hydrogen, $C_1$–$C_{30}$-alkyl, $C_5$–$C_8$-cycloalkyl, $C_7$–$C_{18}$-aralkyl or $C_6$–$C_{14}$-aryl which may be substituted by up to three $C_1$–$C_{12}$-alkyl groups, $C_1$–$C_{12}$-alkoxy groups, cyano groups, hydroxyl groups or $C_1$–$C_4$-alkoxycarbonyl groups and $R^2$ and $R^3$ may be identical or different and are each hydrogen, an aliphatic or aromatic hydrocarbon radical, a primary or secondary, aromatic or aliphatic aminoalkylene radical or a polyaminoalkylene radical, polyoxyalkylene radical or heteroaryl or heterocyclyl radical or, together with the nitrogen atom to which they are bonded, form a ring in which further hetero atoms may be present, and n is from 1 to 10.

4. A reaction product III as claimed in claim 3, in which $R^1$ is hydrogen or $C_1$–$C_4$-alkyl.

5. A process for the preparation of a reaction product III as claimed in claim 3, wherein a polyolefin having predominantly a terminal double bond and a number average molecular weight of from 250 to 10,000, which possesses an aliphatic hydrocarbon skeleton which is straight-chain or carries $C_1$–$C_4$-alkyl side chains, is reacted with from 1 to 10 mol, per equivalent of double bond, of one or more vinyl esters of the formula I

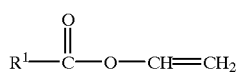 (I)

where $R^1$ is hydrogen, $C_1$–$C_{30}$-alkyl, $C5$–$C_8$-cycloalkyl, $C_7$–$C_{18}$-aralkyl or $C_6$–$C_{14}$-aryl which may be substituted by up to three $C_1$–$C_{12}$-alkyl groups, $C_1$–$C_{12}$-alkoxy groups, cyano groups, hydroxyl groups or $C_1$–$C_4$-alkoxycarbonyl groups, in the presence of a free radical initiator at from 40 to 220° C., it being possible for this reaction product subsequently to have been hydrolyzed to the corresponding alcohol or converted into the corresponding amine by reductive amination with an amine of the formula II

 (II)

where $R^2$ and $R^3$ may be identical or different and are each hydrogen, an aliphatic or aromatic hydrocarbon radical, a primary or secondary, aromatic or aliphatic aminoalkylene radical or polyaminoalkylene radical, a polyoxyalkylene radical or a hetaryl or heterocyclyl radical, or, together with the nitrogen atom to which they are bonded, form a ring in which further hetero atoms may be present.

6. A composition, comprising a fuel or lubricant and an effective amount of one or more reaction products of polyolefins with vinyl esters of formula I as claimed in claim 1.

7. A composition as claimed in claim 6, which comprises a fuel and said one or more reaction products of polyolefins with vinyl esters of formula I in an amount from 10 to 5,000 ppm.

8. A composition as claimed in claim 6, which comprises a lubricant and 0.1 to 6% by weight of said one or more reaction products of polyolefins with vinyl esters of formula I.

9. A composition as claimed in claim 6, which comprises 0.1 to 30% by weight of said one or more reaction products of polyolefins with vinyl esters of formula I as a carrier oil component.

10. A composition as claimed in claim 6, wherein said polyolefin is polyisobutene and said one or more vinyl esters of formula I is vinyl acetate.

11. A composition, comprising a fuel or lubricant and an effective amount of one or more reaction products of formula III as claimed in claim 3.

12. A composition as claimed in claim 11, which comprises a fuel and said one or more reaction products of formula III in an amount from 10 to 5,000 ppm.

13. A composition as claimed in claim 11, which comprises a lubricant and 0.1 to 6% by weight of said one or more reaction products of formula III.

14. A composition as claimed in claim 11, which comprises 0.1 to 30% by weight of said one or more reaction products of formula III as a carrier oil component.

* * * * *